United States Patent [19]

Nakashima

[11] Patent Number: 4,759,118
[45] Date of Patent: Jul. 26, 1988

[54] METHOD OF MANUFACTURING THIN FILM MAGNETIC HEAD

[75] Inventor: Keishi Nakashima, Nagaoka, Japan
[73] Assignee: Alps Electric Co., Ltd., Japan
[21] Appl. No.: 11,155
[22] Filed: Feb. 5, 1987
[30] Foreign Application Priority Data May 8, 1986 [JP] Japan ................ 61-105705

[51] Int. Cl.$^4$ ................ G11B 5/42
[52] U.S. Cl. ................ 29/603; 360/122; 360/123
[58] Field of Search ............ 29/603; 360/103, 104, 360/122, 123

[56] References Cited

U.S. PATENT DOCUMENTS 4,219,853 8/1980 Albert et al. ................ 360/103
4,418,472 12/1983 Lorenze, Jr. ................ 29/603

FOREIGN PATENT DOCUMENTS 0042715 3/1986 Japan ................ 29/603

Primary Examiner—Carl E. Hall
Attorney, Agent, or Firm—Guy W. Shoup; Leighton K. Chong

[57] ABSTRACT

A method of manufacturing a thin film magnetic head is disclosed. This method is characterized such that a protection film is formed on a substrate; only corresponding portions of the protection film to bonding pads are ground in a groove-like configuration before cutting out the thin film magnetic heads therefrom so that the bonding pads are exposed; and the substrate is cut to a predetermined size per thin film magnetic head. With this arrangement, it is feasible to prevent an upper magnetic layer from being damaged during the grinding operation.

2 Claims, 5 Drawing Sheets

METHOD OF MANUFACTURING THIN FILM MAGNETIC HEAD

BACKGROUND OF THE INVENTION

1. Field of the Invention:

The present invention relates to a method of manufacturing a thin film magnetic head, and more particlarly, to a method of forming the thin film magnetic head by employing a substrate which is completely subjected to a thin film forming process.

2. Description of the Prior Art:

A method of manufacturing a thin film magnetic head which completely undergoes a thin film forming process will hereinafter be described with reference to FIGS. 5 to 7. A protection film 12 is, as illustrated in FIG. 5(a), laminated on a non-magnetic substrate 11 wherein a prerequisite thin film forming process is completed. This non-magnetic substrate 11 is cut along the cutting-plane lines A-A' and B-B' and is then subjected to a slider processing, thus forming a thin film magnetic head 10 (FIG. 5(b)). Subsequently, the surface of the protection film 12 thereof is uniformly ground; and bonding pads 13 formed on the non-magnetic substrate 11 are exposed, thereby completing the formation of the thin film magnetic head 10 (FIG. 5(c)). Lead wires are afterward connected to the bonding pads 13. The grinding operation of the surface of the protection film 12 may often be performed prior to the slider processing.

The bonding pads 13 are, as illustrated in FIGS. 7(a), 7(b), formed by plating or other similar methods on a lead terminal 14 of coils 14 produced by a thin film forming technique on the non-magnetic substrate 11. The reference numeral 22 stands for an insulating layer which covers the lower circumference of the bonding pads 13. The coils 14 are, as shown in FIGS. 6(a), 6(b), concentrically disposed round the center, viz., a back gap 17 formed between a lower magnetic layer 15 and an upper magnetic layer 16; and the circumference thereof is covered with an insulator layer 18. An insulator layer 20 is inserted in a front gap 19, videlicet, this layer 20 is interposed between the lower magnetic layer 15 and the upper magnetic layer 16, thus constituting the magnetic gap 19. The numeral 21 represents a base film formed on the non-magnetic substrate 11. The above-described components are provided on the non-magnetic substrate 11 so that each component is disposed in two sets on the respective thin film magnetic heads 10. A technology to form a film relative to the above-mentioned components which requires an etching process is well known, and this is not associated with the present invention. Further description is therefore omitted for convenience.

According to the conventional method of manufacturing the thin film magnetic head, when the surface of the protection film 12 is uniformly ground and the bonding pads 13 are exposed, the upper magnetic layer 16 (magnetic core) must not be ground. For this reason, a height of the bonding pad has to be sufficiently greater than that of the upper magnetic layer 16, and at the same time the protection film has to be considerably thick, taking a grinding allowance into consideration. The surface grinding operation of the protection film 12 is carried out after cutting out the thin film magnetic heads 10 from the non-magnetic substrate 11. Consequently, even if such consideration be a given, there will be probability for the upper magnetic layer 16 to be ground, depending on dispersiveness of the respective thin film magnetic heads and on the bonding accuracy of a jig. Hence, there arise problems wherein it is difficult to improve the yield and to reduce the number of required processes.

SUMMARY OF THE INVENTION

Accordingly, it is a primary object of the present invention which obviates the above-described problems inherent in a conventional manufacturing method to provide a method of a manufacturing a thin film magnetic head wherein it is possible to gradually decrease both a height (film thickness) of a bonding pad and thickness of a protection film, there is no likelihood of grinding an upper magnetic layer, and further it is feasible to enhance the yield and to reduce the costs of production.

To this end, according to one aspect of the invention, there is provided a method of manufacturing a thin film magnetic head, in which positions of a magnetic core and of the bonding pad deviate in plane on a thin film pattern formed on a non-magnetic substrate, this method comprising the steps of: forming the protection film on the substrate; grinding corresponding portions only of the protection film to the bonding pads in a groove-like configuration before cutting out the thin film magnetic heads therefrom instead of uniformly plane-grinding the surface of the protection film in a conventional manner; causing the bonding pads to be exposed; and cutting the substrate to a predetermined size for each thin film magnetic head.

These and other objects, features and advantages of the invention will become more apparent on reading the following detailed description in connection with the accompanying drawings.

DETAILED DESCRIPTION OF THE PREFERRED EMBODIMENT

The present invention will hereinafter be described with reference to the accompanying drawings.

Figure 1A:
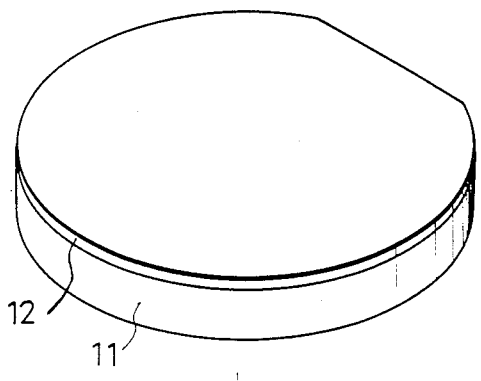
FIGS. 1(a), 1(b), 1(c) are perspective views each showing a thin film magnetic head according to the present invention.
Figure 1B:
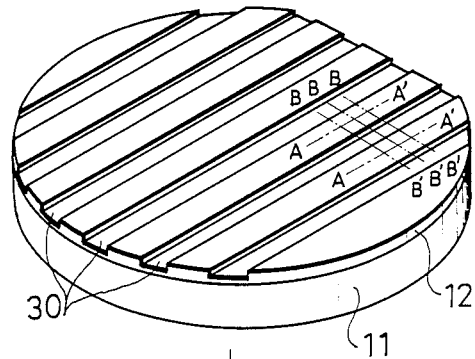
Figure 1C:
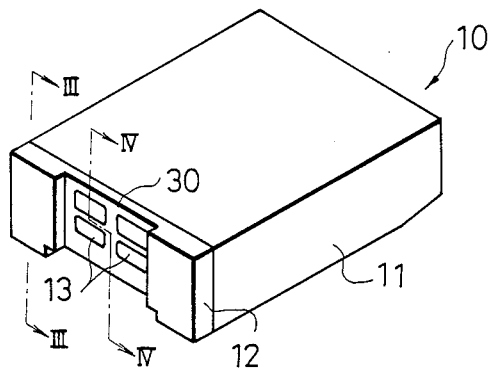
Figure 2:
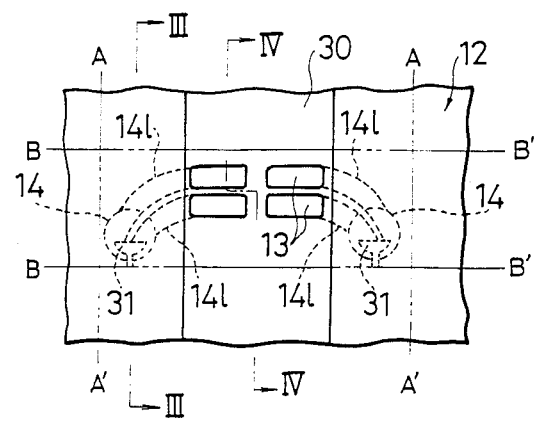
FIG. 2 is a partially expanded plan view of FIG. 1(b)

A method of manufacturing a thin film magnetic head according to the present invention, as illustrated in FIGS. 1(a), 1(b), 1(c), comprises the steps of: adhering a protection film 12 on a non-magnetic substrate 11 which is completely subjected to a thin film forming process and a bonding pad forming process; grinding grooves 30 at predetermined spacings in the surface of the protection film 12 by means of a grind stone before cutting out the film magnetic heads 10 therefrom; and causing the bonding pads 13 to be exposed. The grooves 30 are, as shown in detail in FIGS. 2 to 4 inclusive, ground with respect to portions only which correspond to the bonding pads 13; and the positions and widths of the respective grooves 30 are determined so that the portions (See FIG. 2) corresponding both to an upper magnetic layer 16 (magnetic cores 31) and to coils 14 are not ground. In the wake of this, the non-magnetic substrate 11 is cut along the cutting-plane lines A-A', B-B' of FIG. 1(b) and then undergoes a slider processing, thus finishing formation of the thin film magnetic heads 10. The grooves 30 are ground with respect not to the entire surface of the protection film 12 but to only the portions corresponding to the bonding pads 13 and hence a final configuration of the thin film magnetic head 10 manufactured by the method according to the present invention is different from that of a conventional head. Namely, as for the head formed by the conventional method, the whole surface of the protection film 12 is ground. The method of the present invention is, however, such that each corresponding side of the grooves 30 to the upper magnetic layer 16 is not ground in order to be left there.

Figure 3:
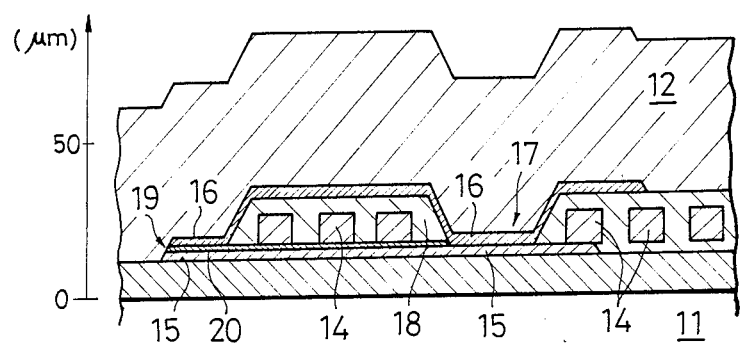
FIGS. 3, 4 are sectional views taken substantially along the lines III—III, IV—IV of FIG. 1(c) and FIG. 2.
Figure 4:
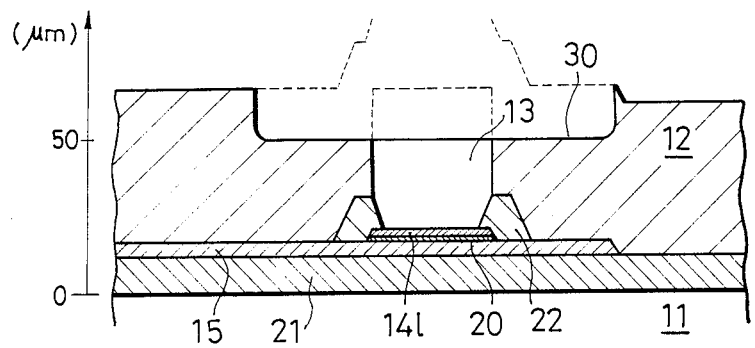
Figure 5A:
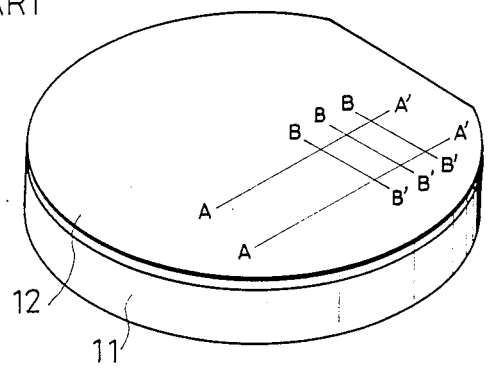
FIGS. 5(a), 5(b), 5(c) are perspective views each showing a process of manufacturing a conventional thin film magnetic head.
Figure 5B:
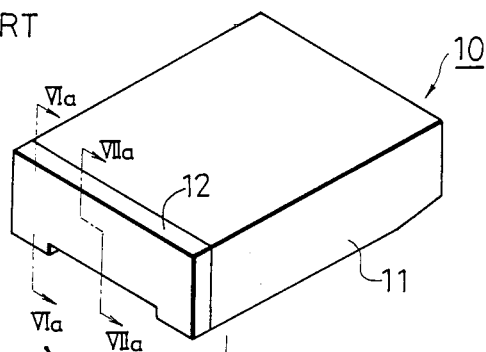
Figure 5C:
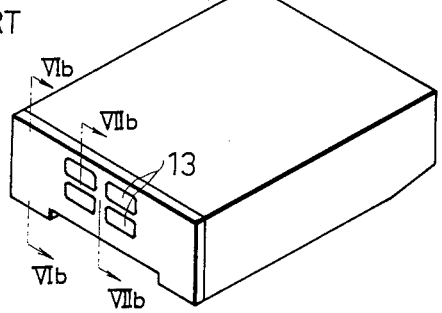
Figure 6A:
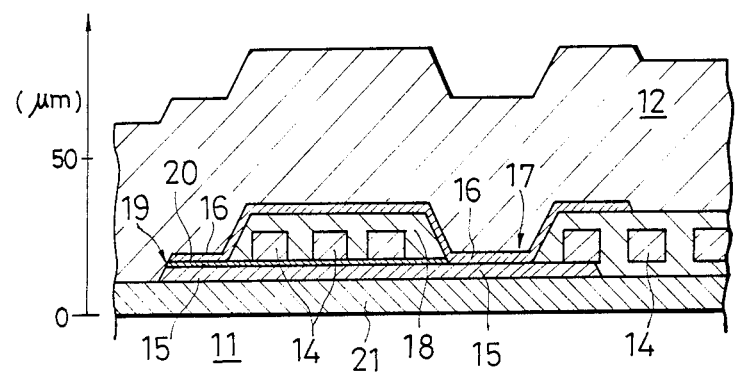
FIGS. 6a, 6b, 7a, 7b are sectional views taken substantially along the lines VIa—VIa, VIb—VIb, VIIa—VIIa, VIIb—VIIb.
Figure 6B:
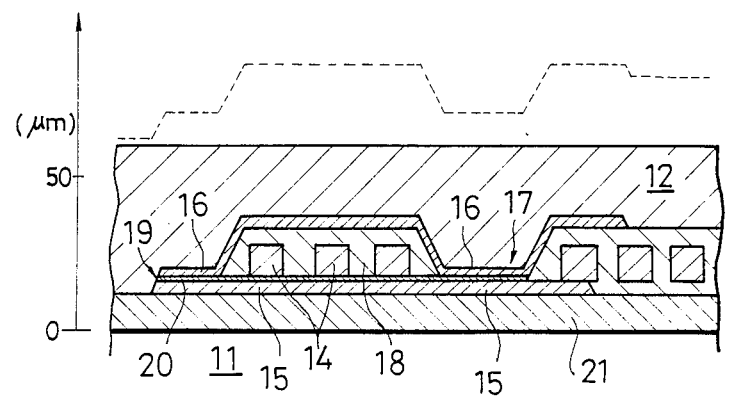
Figure 7A:
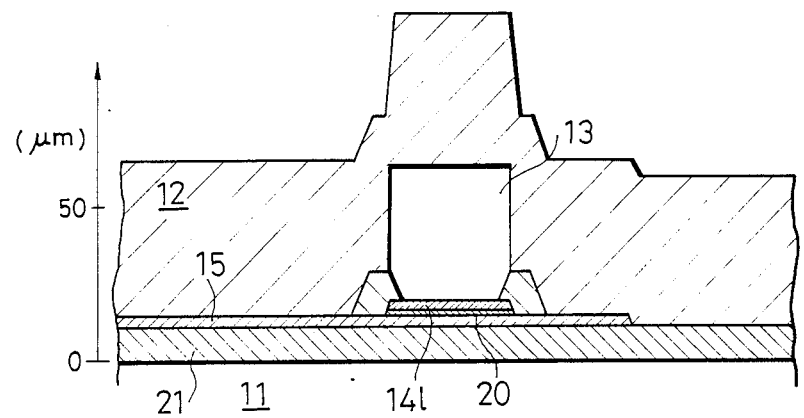
Figure 7B:
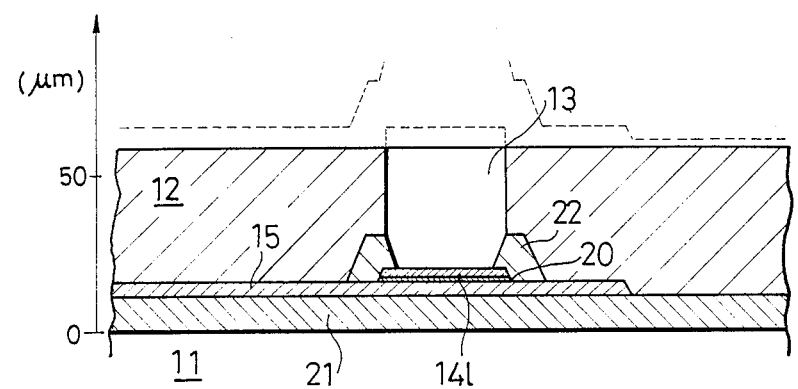

FIGS. 3, 4 schematically show conditions of the ground portion relative to the groove 30 and of the non-ground portion. As is obvious from these Figures, the bonding pads 13 are exposed in the groove 30; and the upper magnetic layer 16 is not ground. Therefore, the bonding pads 13 are not necessarily rendered higher than the upper magnetic layer 16, whereby the upper magnetic layer 16 suffers no damage during the grinding operation of the protection film 12. Furthermore, the thickness of the protection film 12 may be set without considering the grinding allowance thereof, thus permitting the film thickness to be the least value enough to accomplish the purpose for protecting the thin film element.

As can be clarified from the above description, the method of manufacturing the thin film magnetic head according to the present invention yields the following effects. The protection film on the substrate is ground; the bonding pads each conducting to the respective coils are exposed; and only the portions corresponding to the bonding pads are ground in a groove-like configuration, whereby there is possibility to cause the magnetic core to be damaged during the grinding operation. The height (film thickness) of the bonding pad is not necessarily made greater than that of the magnetic core; and the above-described constitution is effective especially both in a thin film magnetic head the magnetic core of which is high and in, for instance, a magnetic head the coils of which are arranged to be a kind of multi-layer coils, this leading to a decrease in number of manufacturing processes. Inasmuch as the magnetic core does not suffer any damage in time of the grinding operation, it is feasible to improve the yield. Moreover, since it is not required to take the grinding allowance into consideration in regard to the entire area of the protection film, the thickness thereof may be set to the least value enough to meet the purpose of protection, which reduces the cost of production as a whole.

As many apparently widely different embodiments of this invention may be made without departing from the spirit and scope thereof, it is to be understood that the invention is not confined to the specific embodiments thereof except as defined in the appended claims.

What is claimed is:

1. In a method of manufacturing a thin film magnetic head, in which a plurality of thin film magnetic head elements are formed in spaced apart rows on a substrate layer, each including a thin film structure of a lower magnetic layer separated from an upper magnetic layer by an insulator layer forming a head gap therebetween and associated coils having lead terminals connected thereto, said thin film magnetic head elements formed on said substrate are covered by a protection film with a plurality of sets of conductive bonding pads formed through said protection film in conductive contact with respective ones of said lead terminals of the respective thin film magnetic head elements, and the layered structure thus formed is then cut to separate the plurality of resulting thin film magnetic head units therefrom, the improvement comprising the steps of:

forming said protection film on said substrate with said sets of bonding pads arranged in spaced apart rows corresponding respectively to said rows of thin film magnetic head elements and extending depthwise from an upper side of said protection film through said film to the lead terminals of the respective elements; and grinding a linear groove in the upper side of said protection film only along portions corresponding to each one of said rows of bonding pad sets so as to expose the end surfaces of the sets of bonding pads in each row, prior to cutting the layered structure to separate the plurality of resulting thin film magnetic head units therefrom.

2. A method of manufacturing a thin film magnetic head according to claim 1, wherein said upper magnetic layers of said thin film magnetic head elements are formed well below depthwise of the end surfaces of the bonding pads, such that said step of grinding grooves to expose said end surfaces does not result in any damage to said upper magnetic layers.

* * * * *